(12) United States Patent
Götz et al.

(10) Patent No.: US 8,343,605 B2
(45) Date of Patent: *Jan. 1, 2013

(54) ADHESIVE TAPE AND ITS USE

(75) Inventors: Kerstin Götz, Hamburg (DE); Stefan Wulf, Mönchengladbach (DE); Christoph Nagel, Hamburg (DE)

(73) Assignee: tesa SE, Hamburg (DE)

( * ) Notice: Subject to any disclaimer, the term of this patent is extended or adjusted under 35 U.S.C. 154(b) by 60 days.

This patent is subject to a terminal disclaimer.

(21) Appl. No.: 12/474,516

(22) Filed: May 29, 2009

(65) Prior Publication Data

US 2009/0294054 A1 Dec. 3, 2009

(30) Foreign Application Priority Data

Jun. 3, 2008 (DE) .......................... 10 2008 026 448
Nov. 27, 2008 (DE) .......................... 10 2008 060 181

(51) Int. Cl.
  *B32B 9/00* (2006.01)
  *B32B 7/12* (2006.01)
  *B65H 19/18* (2006.01)
  *B65H 69/06* (2006.01)

(52) U.S. Cl. ............. 428/40.1; 428/43; 428/57; 428/58; 428/192; 428/343; 428/906; 242/556; 242/556.1

(58) Field of Classification Search ................. 428/40.1, 428/41.9, 42.1, 43, 57, 58, 137, 192, 202, 428/343, 345, 906; 242/556.1
See application file for complete search history.

(56) References Cited

U.S. PATENT DOCUMENTS

| 5,212,002 | A | * | 5/1993 | Madrzak et al. | ............. 428/41.9 |
| 5,323,981 | A | | 6/1994 | Dionne | |
| 5,996,927 | A | * | 12/1999 | Weirauch et al. | .......... 242/556.1 |
| 7,108,220 | B2 | * | 9/2006 | Nagel et al. | ................ 242/556.1 |
| 7,516,916 | B2 | * | 4/2009 | Titz et al. | ....................... 242/553 |

FOREIGN PATENT DOCUMENTS

| DE | 196 28 317 | 1/1998 |
| DE | 198 41 609 | 3/2000 |
| DE | 199 02 179 | 8/2000 |
| DE | 100 58 956 | 6/2002 |
| DE | 101 23 981 | 1/2003 |
| DE | 10 2005 051 181 | 4/2007 |
| EP | 0 757 657 | 2/1997 |
| WO | 95 29115 | 11/1995 |

* cited by examiner

*Primary Examiner* — Patricia Nordmeyer
(74) *Attorney, Agent, or Firm* — Norris McLaughlin & Marcus, P.A.

(57) ABSTRACT

An adhesive tape for flying splice, having a left and right boundary edge, at least one main carrier and a first layer of self-adhesive on the obverse of the main carrier, the reverse of the main carrier bearing a parting system which is suitable for effecting an adhesive bond to a substrate that can be parted again in such a way that sticky residues are left neither on the reverse of the main carrier nor on the substrate in the region of the parted bond, the parting system being constructed in a particular form as described herein.

17 Claims, 9 Drawing Sheets

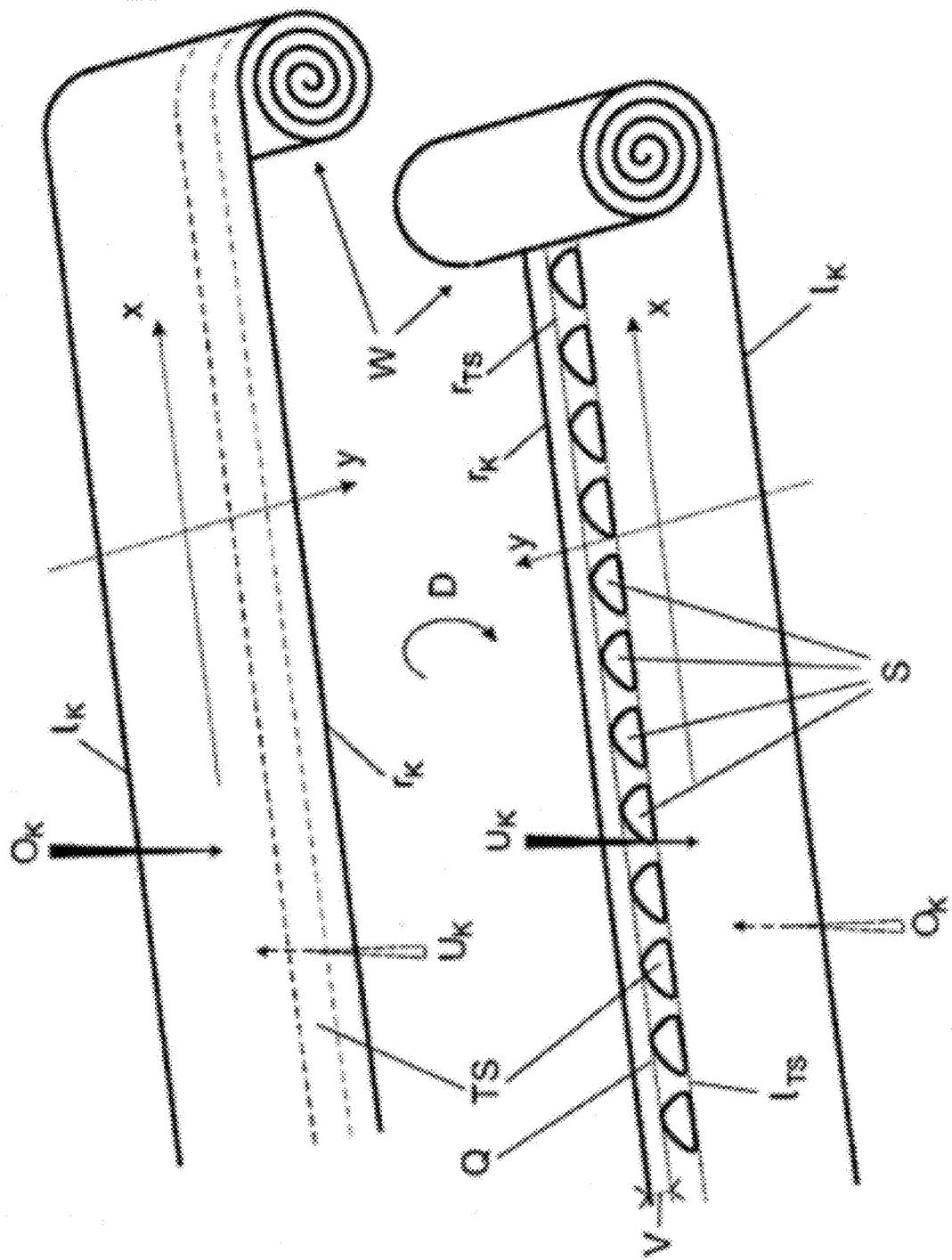

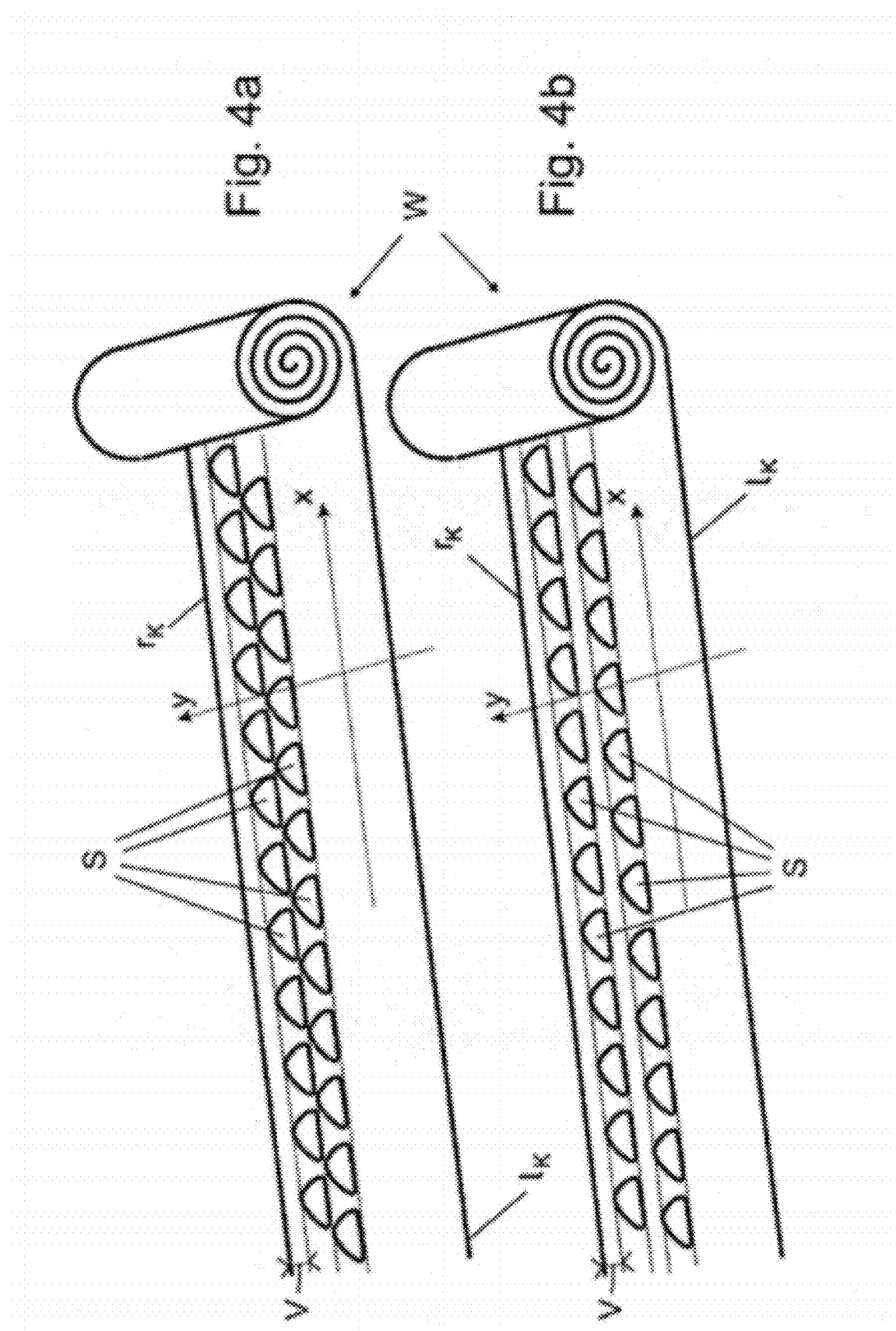

ADHESIVE TAPE AND ITS USE

The invention relates to an adhesive tape for flying splice of flat-web material wound up to form rolls, in accordance with the features described hereinbelow, and also to a method of on-the-fly splicing of flat-web material wound up to form rolls.

In the processing of flat-web material (paper, films, nonwovens or the like) flying splice is a common method of replacing an old, almost fully unwound roll by a new roll without having to stop the quick-running machines in order to do so. In the course of on-the-fly roll changes of this kind it is common to employ (pressure-sensitive) adhesive tapes in order to join (or splice) the end of the old web to the start of the new web.

For years in this context there have been adhesive tapes known which are adhered in a straight line beneath or atop the uppermost ply of the new roll and so combine in one tape the function of the roll closure and also of the adhesive splicing tape (the adhesive tape that joins the new flat web (more particularly a paper web) to the old, expiring flat web).

During the splicing operation it is necessary for the roll closure to open in order to allow the new flat web to be attached to the end portion of the expiring flat web, so that, after the splicing operation, the new flat web runs off from the new roll in a continuous operating regime.

U.S. Pat. No. 5,323,981 discloses a two-sided adhesive tape having on its outside a high-tack adhesive for flying splice. On its reverse there are two adhesives positioned which advantageously have an adhesive-free zone between the adhesives. In this arrangement, the rear adhesive, which is permanently adhesive, is bonded to the uppermost ply of the new roll, and the front adhesive, which is repositionable, is bonded via the uppermost ply to the 2nd ply. In this version, the repositionable adhesive plays the part of the roll closure. In the case of flying splice, the expiring web comes into contact with the new roll on the top face of the adhesive tape. The repositionable adhesive detaches from the material of the 2nd ply, and the new roll is drawn into the machine, held by the permanent adhesive at the end of the adhesive tape.

WO 95/29115 discloses a similar adhesive tape. This two-sided adhesive tape has two adhesives on the top face and one adhesive on the bottom face.

This adhesive tape is fastened beneath the uppermost ply of the new roll. In this arrangement, one adhesive holds the uppermost ply. The 2nd adhesive is responsible for contact with the expiring web. On the reverse face there is also a repositionable adhesive, which in the case of the splice exposes the uppermost ply.

Both adhesive tapes have a common disadvantage. With both of them, the repositionable adhesive runs openly through the finishing machine, with the consequence that there may be instances of webs sticking to deflection rollers or printing blankets. This may then lead to tears in the webs.

A remedy to this problem is taught by DE 196 28 317. The adhesive tape has a construction similar to that of WO 95/29115, but the repositionable adhesive on the reverse face is replaced by a two-sided adhesive tape featuring a splittable carrier. In the case of the splice, the carrier splits and, with the respective remnants, covers the adhesives in such a way that they remain non-adhesive. This prevents disruptive instances of sticking in the course of passage through the finishing machines.

A further remedy is taught by DE 199 02 179. In that case the splitting stripe is recessed from the front edge. This recession permits a significant increase in splicing efficiency. DE 198 41 609 describes a double-sidedly adhesive attachment element. The carrier is composed not of a single-ply paper but instead of a paper/paper composite which is joined with curing adhesive dots. This adhesive tape is also adhered beneath the uppermost ply. In the case of the splice, the adhesive dots extract fibres from one of the composite papers, thereby exposing the uppermost ply.

All of these products have a disadvantage. The splittable system, whether it be a paper, a composite of 2 papers, a paper/film composite, a composite of 2 films, or a polymer layer which splits, exhibits a force peak at the moment of incipient splitting, as a result of the fact that the splittable system splits simultaneously over its entire width.

Particularly when the adhesive splicing tape is used on coated papers, and especially on coated gravure papers, the force spikes lead continually to the failure of the adhesive tape. One of the reasons for this failure is that the splitting forces can be higher than the forces which anchor the paper coating, in which case the coating separates from the paper. Or else the splitting forces are in fact higher than the internal strength of the paper, in which case there are paper tears. In both cases the splice is unsuccessful.

An improvement is taught by DE 100 58 956 A1. In order to avoid a force spike, the splitting stripe has a jagged design. The tips of the jags point in the running direction of the operation, and so, at the moment of splicing, the tip of the jag begins to split. Because of the small area in the tip, the force values are reduced as well.

This system, however, has the disadvantage that, at the tip of the jag, the bond area approaches 0. Accordingly the bond strength at the tip is not enough to ensure splitting at the tip. Depending on the quality of the paper to be split, there is splitting beneath the tip, specifically at the point where the bond strengths are higher than the splitting forces. In other words, some unsplit components of the splittable stripe pass through the printing or paper further-processing machine, and may lead to instances of contamination. Since the bond strengths of the splittable system are dependent on the paper type, the size of these unsplit components varies and so, too, does the force required for splitting.

An improvement is taught by DE 10 2005 051 181 A1. Here, the splitting stripe is not given a jagged design, but instead is rounded at the tips. This leads to an increase in the bond area, which always generates a sufficient bond strength and thereby ensures reliable splitting.

However, the non-linear geometries of the splittable system exhibit a weakness. When the adhesive tape featuring the splittable system is unwound from a roll of adhesive tape, there are stresses at the leading edges of the splitting system, which stand transversely to the direction of unwinding, and, in certain cases, the splitting stripe begins to split. Premature splitting occurs in particular in the case of wave forms or geometries which are distinguished by a high slope of the geometry. Since the splitting system constitutes a coherent two-dimensional structure, the unwanted splitting may run over a relatively long section of the splittable system. This is particularly critical in those cases in which it is not noticed by the user, since the splice performance falls. If the user notices the incipient splitting, the adhesive tape must be newly applied, which is time-consuming and has an adverse effect on productivity.

It is an object of the invention to offer an adhesive tape which avoids the disadvantages of the prior art and in particular allows reliable unrolling from the roll of adhesive tape and application of the adhesive tape without premature incipient splitting.

This object is achieved by means of an adhesive tape for flying splice, having a left (l) and right (r) boundary edge, comprising at least one main carrier and a first layer of self-adhesive on the obverse (O) of the main carrier, the reverse (U) of the main carrier bearing a parting system which is suitable for effecting an adhesive bond to a substrate that can be parted again in such a way that sticky residues are left neither on the reverse of the main carrier nor on the substrate in the region of the parted bond, the parting system being constructed in the form of a multiply interrupted stripe comprising a plurality of segments that extends in the longitudinal direction of the adhesive tape (x direction), it being possible for the boundary edge of each of the segments to be represented by a line F which, in relation to a right-handed Cartesian (orthogonal) coordinate system, with an x-axis lying in the longitudinal direction of the adhesive tape and a y-axis standing perpendicularly to said x-axis and pointing from left to right, meets the following conditions:

a point lying furthest right $E_1(x_1/y_{max})$ ("extreme") or a region $B_1$ ("extreme region") which encompasses a plurality of points lying furthest right and which is bounded by the points $E_{1a}(x_{1a}/y_{max})$ and $E_{1b}(x_{1b}/y_{max})$, with $x_{1a} < x_{1b}$, a vertex point $E_2(x_{min}/y_2)$ lying least far in the x direction or a region $B_2$ which encompasses a plurality of points lying least far in the x direction and which is bounded by the points $E_{2a}(x_{min}/y_{2a})$ and $E_{2b}(x_{min}/y_{2b})$, with $y_{2a} < y_{2b}$, a vertex point $E_3(x_{max}/y_3)$ lying furthest in the x direction or a region $B_3$ which encompasses a plurality of points lying furthest in the x direction and which is bounded by the points $E_{3a}(x_{max}/y_{3a})$ and $E_{3b}(x_{max}/y_{3b})$, with $y_{3a} < y_{3b}$, a rising line section ($F_s$) which is bounded by the points $E_2$ or $E_{2b}$ and $E_1$ or $E_{1a}$, a falling line section ($F_f$) which is bounded by the points $E_1$ or $E_{1b}$ and $E_3$ or $E_{3b}$, and, for the majority of the segments (S), the slope in the rising line section ($F_s$) being lower than the slope in the falling line section ($F_f$).

The steepness of a particular line section (of a particular section of the segment boundary edge) is understood for the purposes of this specification to be the amount of the slope of a straight line through the two line points that bound the line section. The steepness of a line section therefore corresponds in particular mathematically to the average of the first derivative of the line section, in so far as the line section can be represented as a Riemann integral of its first derivative.

The form of the splitting segments sets the corresponding splitting force, as a function of the material. The form/geometry of the segment in question is intended to require as little force as possible for incipient splitting in the transverse direction of the adhesive tape. This force, however, must also not be too low, so that there is no premature opening, hence leading to tearing, in the acceleration phase of the roll. This applies in particular to belt-driven units in which particular strength is necessary in the region of the belt.

It is especially advantageous, therefore, to provide the boundary edges of the segments, transversely to the unwind direction of the adhesive tape, with a slope which is as low as possible, so that the tendency towards incipient splitting is minimized. This can be achieved in particular by making the segments on the right-hand side—the side at which parting begins in the splicing operation—angular or rounded in the form of a vertex. It is advantageous then to allow the segments to broaden continually from the right side in order to create, in particular, a sufficient bond area.

It is advantageous in particular for the achievement of the object if not only is the amount of the mathematically averaged slope of the rising line section lower than that of the falling line section, but if it is the case for the majority for all of the segments, and with particular advantage for all of the segments, that for a multiplicity of the line points of a rising line section, the amount of the slope of the line (that is, the amount of the value of the derivative of the line at this point) is smaller than the amount of the slope (amount of the derivative) at the point having the same y value of the falling line section that follows in the preferential direction.

With preference a multiplicity of the segments, and better still the majority of the segments, or even better all of the segments in the rising line section each have one or more subsections for each of whose points it is the case that the amount of the slope of the line (that is, the amount of the value of the derivative of the line at that point) there is less than the amount of the slope (amount of the derivative) at the point having the same y value of the falling line section which follows in the preferential direction.

The extent in the y direction—also called the y-extent—of the line subsection or subsections overall preferably accounts in total for at least 50%, better still 75%, even better 90% of the y-extent of the rising line section or of the falling line section that follows in the preferential direction, depending on which of these two y-extents is the smaller. Even more preferably, the y-extent of the line subsection or subsections preferably accounts in total for at least 50%, better still 75%, even better 90% of the y-extent of the rising line section, even if that line section has the smaller y-extent.

The (mathematical) description of the line representing the segment edges takes place advantageously on the basis of the right-handed Cartesian (orthogonal) coordinate system, which is defined in relation to the adhesive tape.

The x-axis (abscissa) of this coordinate system (point of axial intersection) extends in the longitudinal direction of the adhesive tape; the y-axis (ordinate) points from the left to the right edge of the adhesive tape, and the z-axis (applicate) points from the obverse to the reverse of the adhesive tape (z direction).

This position of the point of axial intersection is appropriate since the parting system is visible when the reverse of the adhesive tape is viewed straight on, and the parting system can be best described from this angle of viewing. For the purpose of illustration, in the figures, the coordinate system is drawn in each case with dotted lines.

The right side is therefore defined by the positive y direction of the coordinate system. The preferential direction corresponds more particularly to the x direction in the aforementioned coordinate system.

For the majority of the segments it is mandated in accordance with the invention that the rising line section has a lower steepness (extends more flatly) than the falling line section. Both for these segments, therefore, and for the adhesive tape, there is no mirror axis which extends parallel to the y-axis.

It is preferably the case for more than 50%, more preferably for at least 75%, even more preferably for at least 90%, and ideally for all of the segments, that the rising line section has a lower steepness (extends more flatly) that the falling line section that follows.

It is particularly advantageous if for more than 50%, preferably for at least 75%, more preferably for at least 90%, ideally for all of the segments, it is the case that the steepness in the falling line section of a segment is higher than the steepness of the rising line section of the segment that follows it in the x direction.

The design of the rising and/or the falling line sections may be such that they extend linearly, or substantially linearly, at least over a sub-region; alternatively—independently of one another—they may be designed such that they exhibit one or more points of inflection.

In the extreme case the form of the line is such that the falling section extends perpendicularly (parallel to the y-axis), or extends perpendicularly in one or more subsections.

In a first advantageous embodiment of the invention, the rising line sections ascend monotonically and/or the falling line sections descend monotonically; one development of this variant is that wherein the line sections ascend and/or descend with a strict monotone.

A further variant of the invention is that in which the sections show no monotone in their course, so that there are local maxima and minima (and/or local maximum regions and/or minimum regions) in the rising line section and/or in the falling line section. In that case, however, the invention is satisfied if over the corresponding line sections overall there is a rise or fall as defined in accordance with the invention—if, therefore, a rise and/or a fall is observed over the line section considered in each case overall and the condition relating to the steepness ratios thereof is met.

Also possible are points of inflexion and/or plateaus in the course of the rising and/or falling line sections.

The course of the line through the point $E_1$ lying furthest right ("extreme") can—in a preferred way—be designed such that the line can be differentiated at least in the extreme region, so that the course through the extreme is characterized by a "round" line course; alternatively, it may also be designed such that the line cannot be differentiated there, so that a peak is present in the extreme.

The transition of the rising section into an extreme region and/or the transition of an extreme region into a falling section may also in each case be characterized by a line course which can be differentiated or which cannot be differentiated. For the extreme regions the case is that the first derivatives here extend monotonically, but not with a strict monotone (the value of the first derivative is zero for all points of the extreme region).

The left region of the line (F) (course of the line between the points $E_2$ and $E_3$ on the left-hand side) may in particular also be designed such that it can always be differentiated (in other words can be differentiated over the entire course in this region). With particular advantage, the course of the line in the region of the points $E_2$ and $E_3$ is rounded as well; conversely, however, a peak may also be provided here in each case or in one of the two points.

BRIEF DESCRIPTION OF THE DRAWINGS

Further illustration of the adhesive tape of the invention is served by the following figures, which are intended merely to provide a diagrammatic representation of the invention, but which do not signify any restrictions with regard to the individual embodiments; in particular, the shape of the segments (S) of the parting system (TS) on the reverse of the adhesive tape that they show is given only by way of example.

FIG. 4a-b diagrams of parting systems showing periodic sequences of identical segments and interstices between segments.

Figure 1C:
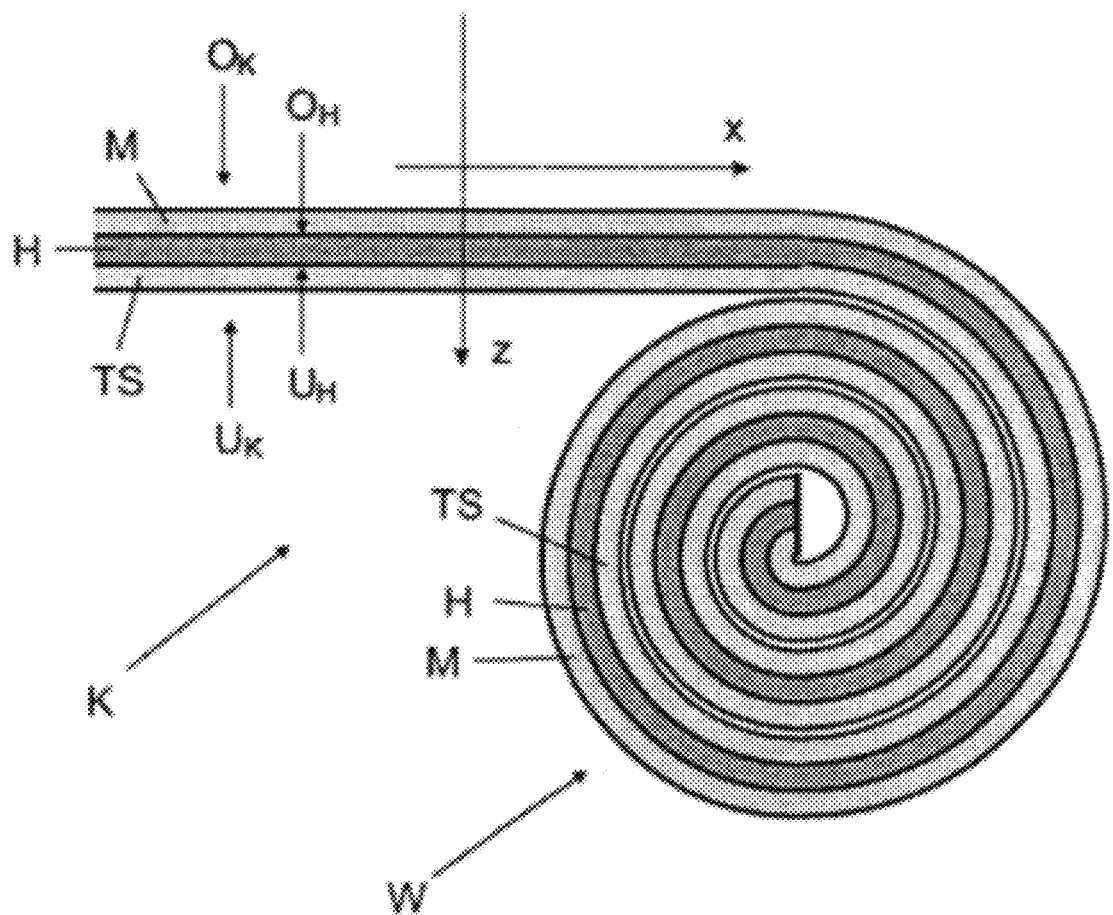
FIG. 1c cross section of the adhesive tape in longitudinal direction (x direction) and FIG. 1d cross section of the adhesive tape in transverse direction (y direction).

The adhesive tape (K) first comprises a main carrier (H) which on its obverse ($O_H$) bears a self-adhesive (M) (not shown separately in FIGS. 1a and 1b). The obverse ($O_K$) of the adhesive tape (K) and the obverse ($O_H$) of the main carrier (H) are situated on the same side (top); similar comments apply to the reverse faces ($U_K$, $U_H$) of the adhesive tape (K) and of the main carrier (H) (bottom in each case)—in this regard see FIG. 1c.

FIG. 1a shows a view of such an adhesive tape from the top, so that the obverse ($O_K$) of the adhesive tape (K), provided with the self-adhesive, lies at the top in the depiction of FIG. 1a. On the reverse ($U_K$) of the adhesive tape is the parting system (TS) comprising a multiplicity of segments (S). In FIG. 1a this parting system (TS) is shown in dashed lines and only in terms of its course, diagrammatically (in particular the segmentation is not shown), since it lies below the adhesive tape and hence in the region which is not visible.

The adhesive tape can be wound to a roll (W), in which case the obverse ($O_K$) of the adhesive tape (K) represents the outside of each turn, and the reverse ($U_K$) of the adhesive tape (K) represents the inside of each turn (see also, in parallel, FIG. 1c). In FIG. 1c it is shown that the obverse ($O_K$) of the adhesive tape (K) may optionally bear a liner (A), in particular of a release material, whose purpose, more particularly, is to allow the adhesive tape to be handled, and more particularly to bring about a release effect between the individual plies of adhesive tape when the adhesive tape is wound (in FIG. 1d this liner (A) is likewise shown). The liner (A) is composed more particularly of a siliconized material, preferably of siliconized paper.

With regard to the adhesive tape (K), furthermore, the Cartesian (orthogonal) coordinate cross described in the introduction is shown, its x-axis (abscissa) extending in the longitudinal direction of the adhesive tape, with the axis pointing to the roll turn (W) (x direction); its y-axis (ordinate) pointing from the left ($l_K$) edge of the adhesive tape to the right ($r_K$) edge of the adhesive tape (y direction); and its z-axis (applicate) pointing from the obverse ($O_K$) to the reverse ($U_K$) of the adhesive tape (K) (z direction). The adhesive tape K possesses a left edge ($l_K$) and a right edge ($r_K$); the designations for the edges are given by looking at the obverse ($O_K$) of the adhesive tape (K), in the direction of the roll turn (W).

Since the dimensions of the adhesive tape are determined in principle (but not mandatorily) by the dimensions of the main carrier, the left and right edges ($l_K$, $r_K$) of the adhesive tape (K) are generally the same as those of the main carrier (H).

If the adhesive tape is now turned by 180° [rotation (D)], this gives the view in FIG. 1b:

FIG. 1b shows the view of the reverse ($U_K$) of the adhesive tape (K), and so the parting system (TS) is now situated visibly (above the plane of the main carrier). The parting system is bounded by the straight lines ($r_{TS}$) on the right side and ($l_{TS}$) on the left side, these straight lines being parallel to the x-axis.

Likewise above the plane of the main carrier in this view is the roll turn (W).

The coordinate system then corresponds to the mathematically familiar representation. A further result of the definitions of the directions is that the unwind direction of the adhesive tape corresponds to the x direction when the roll turn is unwound.

Figure 1D:
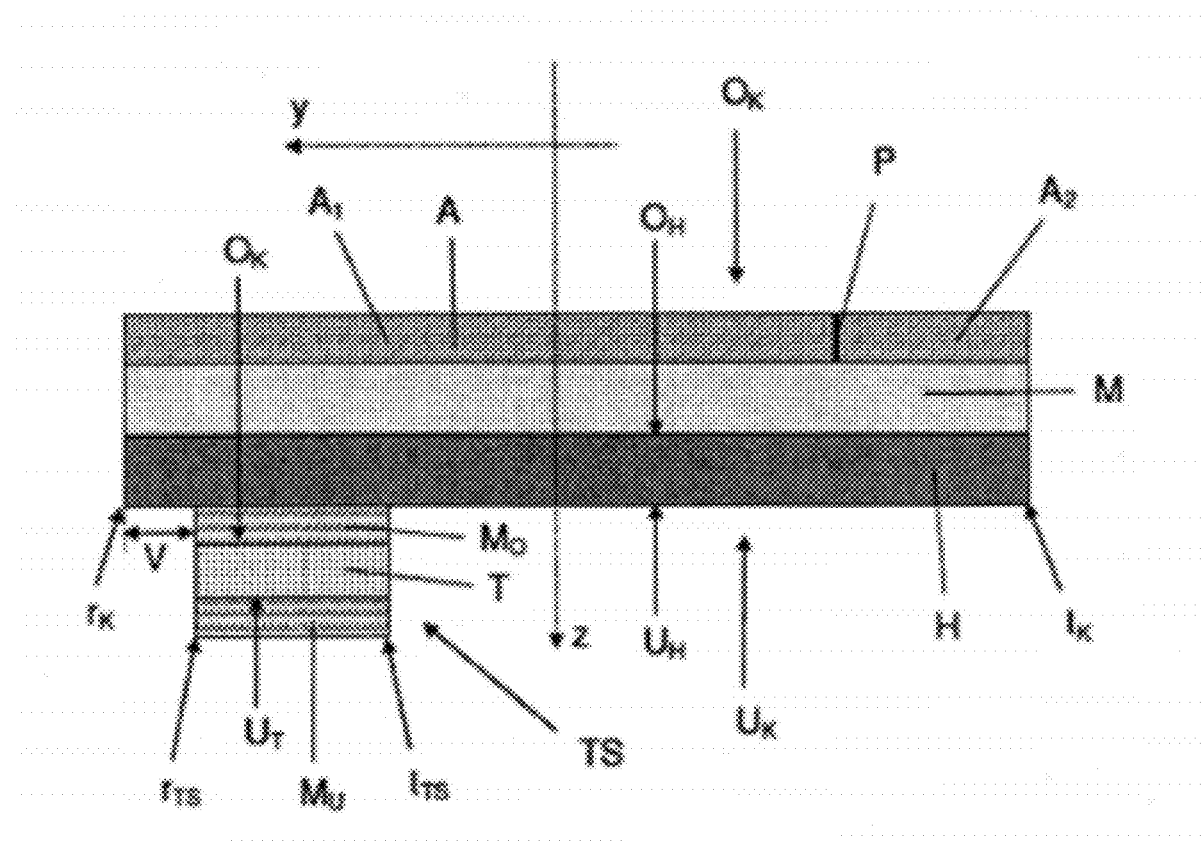
FIG. 1a view of the adhesive tape from above.
FIG. 1b view of the adhesive tape from below.

FIG. 1d shows by way of example, with reference to an arbitrarily selected embodiment, which should not be understood as restricting the invention, a cross section of an adhesive tape of the invention; the direction of viewing corresponds to the positive x direction. The reference symbols correspond to the definitions given previously. In FIG. 1d the optional liner (A) is likewise shown. The liner may be prepared for a possible division or divided into two sections ($A_1$) and ($A_2$) by a cut or a predetermined break point (P), more particularly in the form of a perforation, a kiss cut, a slit or the like, which extends in the longitudinal direction of the adhesive tape, in other words in the x direction, and hence parallel to the longitudinal adhesive-tape edges ($r_K$, $l_K$).

Where the adhesive tape (K) is processed manually in application, it is advantageous for the liner material to have the cut or the perforation (P), so that the resulting pieces can be removed independently of one another. The liner material may also be in unsplit form, particularly when the adhesive tape is bonded subsequently in an automatic or automated operation. For manual bonding, the liner material is preferably paper, since in that case it can be torn by hand. Particularly in the case of automatic application, the liner material may also be composed of film, since in that case the adhesive tape plus liner can be cut by machine. In this case as well, however, it is preferred to use a liner made of correspondingly treated—especially siliconized—paper, since films, on account in particular of their high extensibility, can lead to problems when the adhesive tape is cut off.

The parting system (TS) adhered beneath the tape may be arranged flush to the right longitudinal edge ($r_K$) of the adhesive tape (K). For the use of the invention in flying splice, however, it has emerged as being very advantageous if the parting system (TS) is arranged at a distance (V) from that longitudinal edge ($r_K$) [the distance here refers to the connecting line of the furthest right extremes of the respective segments, in other words the straight parting-system boundary line ($r_{TS}$)].

It is possible, and also embraced by the subject matter of the invention, for the adhesive tape of the invention—particularly for the purpose of fulfilling certain functions such as, for example, a detection function for a machine operating regime—to comprise further layers, which are not shown here.

As far as the diagrammatic representation of the cross section of the adhesive tape (K) is concerned, the construction of the parting system (TS) plays no part at this point and shall therefore remain of no concern here; accordingly, the parting system of the adhesive tape of the invention may possess a construction different from that shown here. FIG. 1d serves later to describe a specific embodiment; it is not the intention at this point, in illustrating the general construction of the invention, to impose an explicit restriction to that embodiment, and the reference symbols ($O_T$, $U_T$, $M_O$, T and $M_U$) will be elucidated at that later point in time.

Figure 2A:
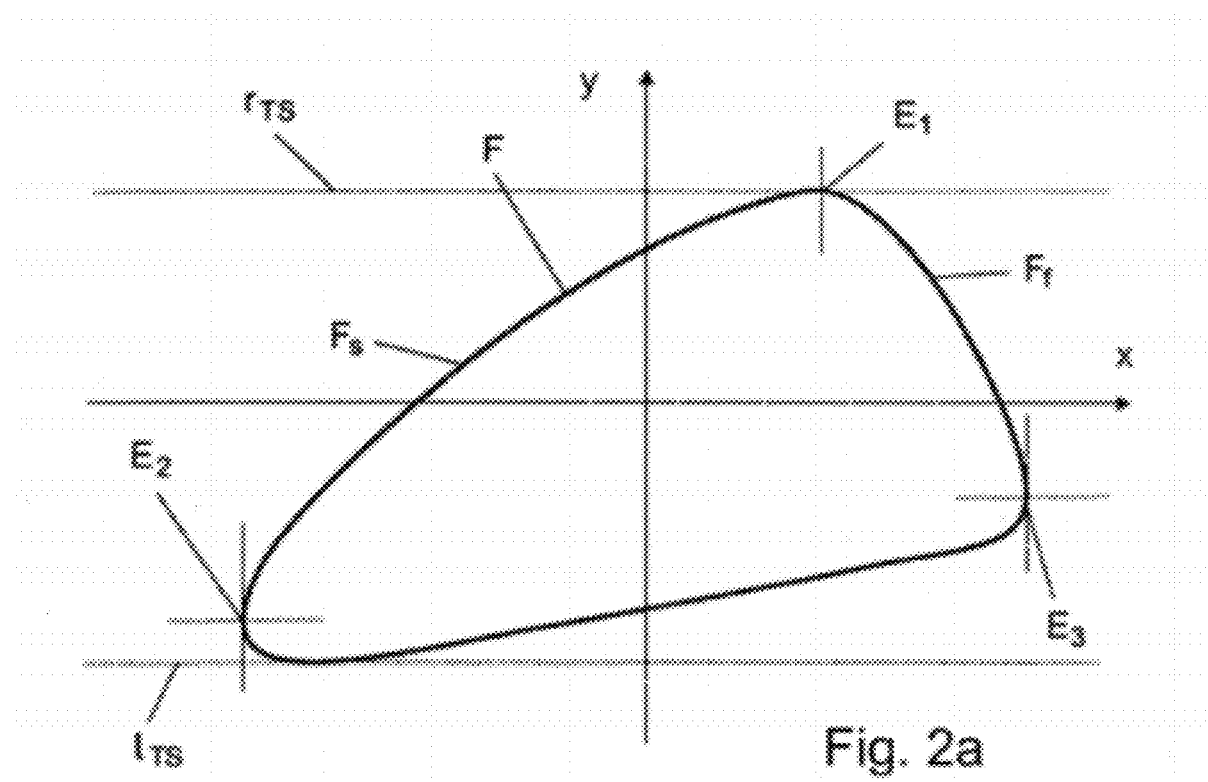
FIG. 2a diagram of a segment of the parting system on the reverse of the adhesive tape, showing a line with points E1, E2 and E3, and a rising line section Fs which is less steep than a falling line section Ff.

FIG. 2a shows an embodiment of a segment of the kind outstandingly suitable for one such embodiment of the adhesive tape of the invention.

The line possesses a point $E_1(x_1/y_{max})$ ("extreme") lying furthest right, and a vertex point $E_2(x_{min}/y_2)$ lying the least far in the x direction, and also a vertex point $E_3(x_{max}/y_3)$ lying furthest in the x direction. The points $E_2$ and $E_1$ bound a rising line section ($F_s$), the points $E_1$ and $E_3$ a falling line section ($F_f$). The steepness in the rising line section ($F_s$) is lower (the line section extends more flatly) than the steepness in the falling line section ($F_f$) (here the course of the line section is steeper).

Figure 2B:
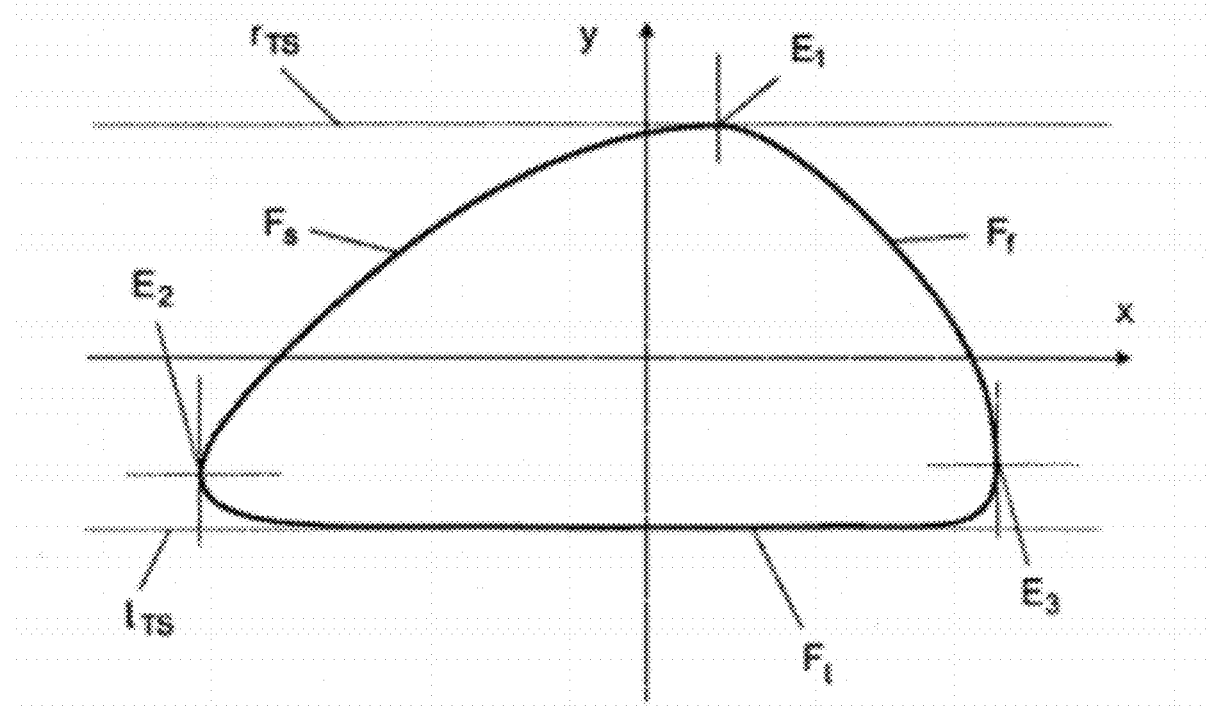
FIG. 2b diagram of a segment of the parting system on the reverse of the adhesive tape, showing a segment where a line section Fl is parallel to the x-axis.

FIG. 2b shows a development of this segment, where the course of the left-hand-side line section $F_l$ (between the vertex points $E_2$ and $E_3$) is substantially (that is, at least in subsections) parallel to the x-axis.

In one preferred procedure, particularly for the last-mentioned variant embodiment, the points $E_2$ and $E_3$ possess the same y values (and so the vertex points are situated at equal distances from the x-axis).

Figure 2C:
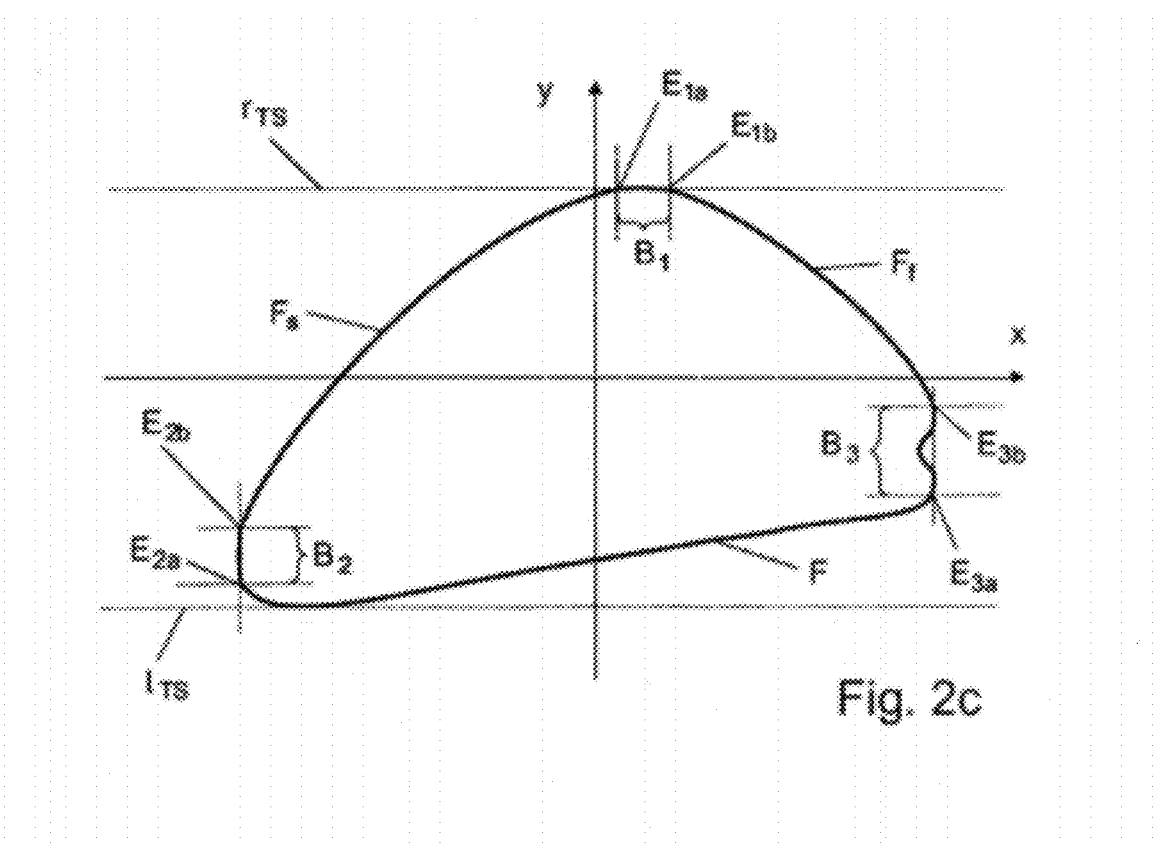
FIG. 2c diagram of a segment of the parting system on the reverse of the adhesive tape, showing a segment where the line possesses an extreme region B1, a region B2, and a region B3.
Figure 3A:
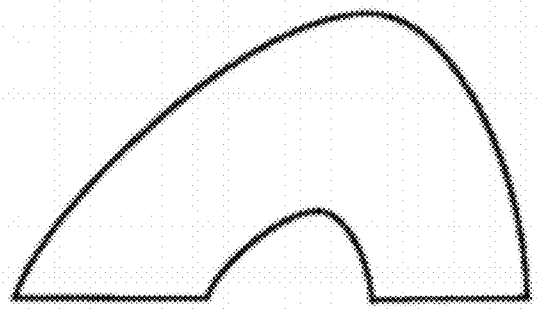
FIG. 3a-d diagrams of segments of the parting system, showing further forms for segments.
Figure 3B:
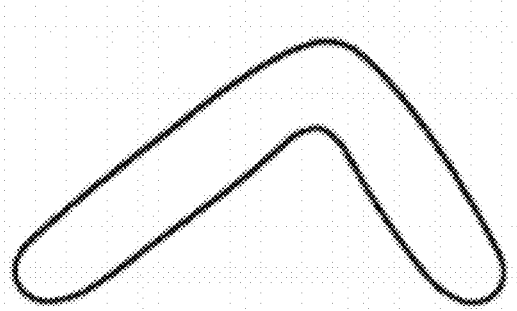
Figure 3C:
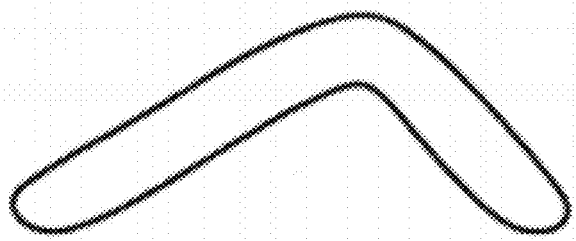
Figure 3D:
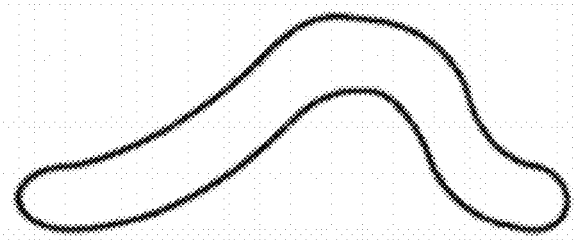

A further advantageous embodiment of the invention is shown in FIG. 2c. Here the line possesses an extreme region $B_1$ which encompasses a plurality of points lying furthest right, $B_1$, which is bounded by the points $E_{1a}(x_{1a}/y_{max})$ and $E_{1b}(x_{1b}/y_{max})$, the point $E_{1a}$ being situated less far in the x direction than the point $E_{1b}$ (i.e. $x_{1a} < x_{1b}$), and also possesses a region $B_2$, encompassing a plurality of points lying least far in the x direction, which is bounded by the points $E_{2a}(x_{min}/y_{2a})$ and $E_{2b}(x_{min}/y_{2b})$, the point $E_{2a}$ lying further left than the point $E_{2b}$ (i.e. $y_{2a} < y_{2b}$), and additionally possesses a region $B_3$, encompassing a plurality of points lying furthest in the x direction, which is bounded by the points $E_{3a}(x_{max}/y_{3a})$ and $E_{3b}(x_{max}/y_{3b})$, the point $E_{3a}$ lying further left than the point $E_{3b}$ (i.e. $y_{3a} < y_{3b}$). The rising line section ($F_s$) in this variant embodiment is bounded by the point $E_{2b}$ of the region $B_2$ that is furthest to the right, and by the point $E_{1a}$ of the extreme region $B_1$ that is situated the least far in the x direction. The falling line section ($F_f$) is bounded by the point $E_{1b}$ of the extreme region $B_1$ that lies the furthest in the x direction, and by the point $E_{3b}$ of the region $B_3$ that is furthest to the right. Here again, in accordance with the invention, the steepness in the rising line section ($F_s$) is lower than the steepness in the falling line section ($F_f$).

As shown in FIG. 2c with reference to regions $B_1$ and $B_2$, it is possible for all of the points of a region $B_1$, $B_2$ and/or $B_3$ to lie furthest in the y direction (furthest to right), least far in the x direction or furthest in the x direction, and so the points of the respective region represent a straight line which is parallel to the x axis or to the y axis, the boundary points being those points whose neighbour is no longer situated the furthest in the corresponding direction. As shown by way of example for the region $B_3$, however, there may also be points within the region which are not situated the furthest in the corresponding direction.

The invention also embraces those lines (F) in which, on the basis of FIG. 2a, one or two of the points $E_1$, $E_2$ and/or $E_3$ are substituted by regions $B_1$, $B_2$ and/or $B_3$, respectively, in other words, so to speak, "hybrid geometries" of the embodiments of FIGS. 2a and 2c.

In the embodiment shown in FIG. 2b as well it is possible for one or two of the points $E_1$, $E_2$ and/or $E_3$ to be substituted by regions $B_1$, $B_2$ and/or $B_3$, respectively.

Shown in FIGS. 3a to 3d by way of example—without thereby wishing to impose any restriction on the subject matter of the invention—are a number of further forms for segments that are outstandingly suitable for the adhesive tape of the invention.

In one advantageous embodiment the parting system represents a sequence in the x direction of identical segments, in other words such that the focal points of the segments are situated on a straight line (base line (X)) (arranged one after another). Very preferably this base line extends in the x direction, but it is also possible to extend the base line at an angle, more particularly an acute angle, to the x-axis, so that the parting system is arranged obliquely on the adhesive tape.

It is advantageous also to provide identical interstices (distances between the segments) between the segments. Very preferably the interstices between the individual segments in the x direction are in each case smaller than the extent of each segment in the x direction.

The parting system may also advantageously be provided in the form of an interrupted stripe of segments whose geometry, while being identical in each case, is one in which the arrangement of the segments is offset in such a way that their focal points lie not on a single straight line extending in the x direction but instead on two or more straight lines. In this case it is possible to adjust the bonding performance of the adhesive tape to outstanding effect via the shape and the size of the segments, the distance between the segments and the position of the parting systems with respect to one another (directly adjacent, spacing between the parting systems, etc.) and their number.

Particularly advantageous here is a periodic sequence of the segments and also, preferably, of the segment interstices. Examples of such an arrangement are shown in FIGS. 4a and 4b, without wishing to impose any unnecessary restriction through the geometry of the segments that are shown there.

In one preferred version the extent of the individual segments in the x direction is lower by a multiple than the extent of the adhesive tape in the x direction. Preferably, additionally or alternatively, the extent of the stripe formed by the segments (S) in the transverse direction of the adhesive tape (K), in other words the y direction, is lower than the extent of the adhesive tape (K) in that direction (in other words, lower than the width of the adhesive tape).

One embodiment of the invention has a parting system in which the segments have different geometries. Here it is possible in particular for there to be two or more groups of segments which are identical within each group, their focal points all lying on a straight line which extends in the x direction. Again, the invention embraces those embodiments in which the focal points of the segments lie not on a single straight line that extends in the x direction but instead on two or more straight lines.

In one very preferred embodiment the focal points of geometrically identical segments each lie on a straight line which extends in the x direction.

Here again, in particular, parting systems with a periodic sequence of the segments are advantageous.

The main backing may with preference be a paper backing. Important properties of this paper are the physical properties, principally the tensile strength. The latter ought to be higher than the web tensions in the printing machine or other processing machines. Particularly in the case of machines with relatively low web tensions, the paper selected may also be thinner. This has advantages for the processing operation, since thinner materials have less of a disruptive effect on passage through the machines.

Nature of the Parting System on the Reverse of the Adhesive Tape

The parting system (TS) on the reverse of the adhesive tape is suitable in accordance with the invention to effect an adhesive bond between the main carrier and a substrate. The parting system is so designed as to permit the adhesive bond effected by the system to part again, without sticky residues being left on the reverse of the adhesive tape, or on the substrate in the region of the parted adhesive bond. This parting takes place two-dimensionally, i.e. in the z direction (slight deviations from the z direction owing to operational inaccuracies or fluctuations in thickness and the like are included and are not intended to oppose the phrase "parting in the z direction"). In the surface region of the parted adhesive bond, therefore, there are to be no sticky or tacky surfaces remaining on the side either of the adhesive tape or of the substrate.

This parting of the adhesive joint without sticky residues being left on the reverse of the adhesive tape or on the substrate in the region of the parted adhesive bond encompasses more particularly a (two-dimensional) splitting process within the parting system (more particularly the two-dimensional splitting of a single-ply or single-piece layer of the parting system), a delamination of two layers of the system that are laminated to one another, or the redetachment of one of the layers of the parting system from the substrate to which the parting system was bonded, and/or the redetachment of one of the layers of the parting system from another layer of the adhesive tape of the invention.

In one embodiment of the parting system as shown illustratively in FIG. 1d, this is put into effect by the parting system (TS) itself being designed in the form of a double-sided adhesive tape which in turn has a carrier (T)—also referred to as a "segment carrier" or "splittable carrier"—which is provided on its obverse ($O_T$) and on its reverse ($U_T$) with one layer in each case of an adhesive ($M_O$, $M_U$).

In a first embodiment the segment carrier is a one-piece (single-ply) carrier which can be split two-dimensionally on exposure to appropriate forces. The adhesive bond produced by means of this parting system can then be parted again by virtue of the segment carrier splitting two-dimensionally in the z direction, and in particular splitting substantially centrally with respect to the surface of the segment carrier; the respective layers of adhesive are covered non-adhesively by the two-dimensional residues of the segment carrier that remain after splitting has taken place.

The segment carrier may also be of multi-ply construction, with one of the carrier layers being splittable.

Carriers referred to in the context of this specification, accordingly as being "splittable" are those which can be split parallel to their superficial extent, and especially those carriers which, based on the requirements in a splicing process, do actually split as well. "Substantially central splitting" in the sense of this invention means that the splitting produces two-dimensional residues of carrier, as splitting products, which are of approximately equal thickness; in contrast to a substantially non-central splitting, in which (two-dimensional) residues of carrier of significantly different thickness are produced as splitting products. In particular, substantially central splitting of the one-piece carrier is to be characterized in that the splitting products reliably and non-adhesively cover the corresponding adhesives. In the case of asymmetrical splitting, this might not be ensured on the part of the excessively thin two-dimensional residue of carrier.

Splittable carriers contemplated include all splittable two-dimensional carrier materials, especially readily cleaving papers, kraft papers, composite paper systems (for example duplex papers and sized paper systems), composite film systems (sized film systems, for example), polymeric composite systems (coextruded polymeric composite systems, for example) and polymeric nonwovens.

It is advantageous to use a splittable carrier whose splitting strength is significantly lower than that of a carrier which is required to accommodate tensile forces. Particular preference is given to using a splittable carrier which has a significantly lower tear propagation resistance than a carrier or carrier layer which accommodates the actual tensile forces in the main plane of the adhesive tape (i.e. than the main carrier H), in order to join the two webs of material to one another. Accordingly the segment carrier is split before the main carrier is destroyed. The splittable system or systems are based preferably on paper. The following papers or composite paper systems in particular, for example, are suitable for this purpose:

sized, highly compacted papers readily splittable paper systems, e.g. papers not possessing wet strength kraft papers (for example, kraft papers glazed on both sides—a kraft paper found to be particularly suitable is one with a thickness of 55 µm and a basis weight of 65 g/m$^2$)

duplex papers (papers with defined lamination, the splitting process is extremely homogeneous; there are no stress peaks as a result, for example, of inhomogeneous compaction. These papers are used for producing wallpapers and filters.)

splittable systems in which the splitting forces are determined via the size of the bonding points; splittable systems of this kind are described in DE 198 41 609 A1, for example.

The top adhesive and the bottom adhesive of the parting system ought to have a high bond strength. In particular it is of advantage if the bond strengths of these self-adhesives are greater on the respective surfaces (carrier and substrate) than the force needed for splitting of the splittable carrier. Advantageous splittable carriers preferably have splitting strengths of 15 to 70 cN/cm, more particular of 22 to 60 cN/cm, very particularly of 25 to 50 cN/cm. On splitting strength and its measurement, refer to DE 199 02 179 A1.

In one variant of this embodiment of the adhesive tape, the carrier (T) of the parting system is not single-ply and two-dimensionally splittable, but is instead designed in the form of two layers which can be parted from one another (delaminated) two-dimensionally (in the z direction). These may be, in particular, paper/paper laminates or film/film laminates or else a laminate of paper with film. Examples of suitable systems include, in particular, the following paper- and/or film-based laminate or composite systems:

duplex papers (papers with defined lamination, the splitting process is extremely homogeneous; there are no stress peaks as a result, for example, of inhomogeneous compaction. These papers are used for producing wallpapers and filters.)

splittable systems in which the splitting forces are determined via the size of the bonding points; systems of this kind are described in DE 198 41 609 A1, for example.

For repulpable adhesive tapes, in particular, a laminate of two papers is advantageous. Examples of paper laminates of this kind are highly compacted papers sized together in a defined manner (especially papers having a high splitting strength). Sizing may be carried out, for example, using starch, starch-containing derivatives, wallpaper pastes based on methylcellulose (Tesa® Kleister, tesa AG, Hamburg; Methylan®, Henkel KGaA, Düsseldorf) or else based on polyvinyl alcohol derivatives. A description is given of such laminate systems in EP 0 757 657 A1, for example.

The laminate may also be a laminate of two polymer layers, of a polymer layer with paper, or of a polymer layer with film, the polymer being more particularly a polymer which can be applied by printing technology, such as gravure printing, screen printing or the like, for instance. Particularly suitable for the polymer here are curing polymer compositions, but also solvent-borne compositions from which the solvent is removed following application, forming the layer, and also polymer compositions which soften in the heated state, in other words have sufficient viscosity to be applied but at application temperature take the form of a sufficiently stable layer.

The adhesive bond formed by means of such a parting system can be parted again by the two layers of the segment carrier parting two-dimensionally from one another (delaminating); the respective layers of adhesive are covered nonadhesively by the two-dimensional layers of the segment carrier that remain after parting.

Also embraced by this variant embodiment, however, are all other adhesive tapes in which the carrier (T) is constructed so as to be partable in two layers, from other materials, the materials of the carrier being adapted more particularly to the respective application.

The core concept of a parting system of this kind is that the splitting process of the splittable system takes place between two layers that can be parted from one another, and not within a layer. Accordingly, for example, no fibres are extracted from a paper carrier, and the force needed to part the layers can be precisely defined. Moreover, prolonged storage of the adhesive tape does not result in any substantial change in the forces needed to part the layers. The nature of the bond of the two layers may be implemented in any desired way or, preferably, as described below. Here as well it is preferred to use a laminate segment carrier which has a distinctly lower "tear propagation resistance" (relative to the delaminating process) than a carrier or a carrier layer which accommodates the actual tensile forces in the main plane of the adhesive tape (i.e. than the main carrier) in order to join the two webs of material to one another. Accordingly the parting system is able to delaminate before the main carrier or one of the segment carrier layers is destroyed. In this case, then, the parting system is composed of at least two layers which undergo delamination, i.e. part from one another, under a defined force exposure which is exceeded in the course of the flying splice. Examples of such systems are coextruded films.

The parting strength of the laminate or of the two carrier-layer systems has more particularly the numerical values as indicated above for the splitting strength of the two-dimensionally splitting, one-piece carrier.

The advantage of a parting system as described above is that the force necessary to part the parting system always remains constant, and so a flying splice can be performed under controlled conditions, and incorrect functioning of the adhesive tape is prevented.

The two partable layers may attach to one another as a result, for example, of adhesion forces. In this case the two layers may be composed of any desired materials, with the adhesion forces between the layers varying on the basis of the respective physical properties. It is possible for the skilled person to select suitable materials in order to obtain a defined adhesion force between the layers. When the adhesive tape is loaded with a force in the normal direction, i.e. substantially perpendicular to the main plane of the adhesive tape, the two layers part from one another as soon as this force is greater than the adhesion force. After splitting has taken place, one of the layers in each case covers the self-adhesives, which are therefore covered in a non-adhesive way. This ensures that the two layers can be parted from one another with a defined force which is constant over time. Since the two layers are able to attach to one another on the basis of adhesion forces, there is no need for an additional adhesive layer, and hence the overall thickness of the adhesive tape can be reduced.

In a further embodiment of the parting system it bears on its top or bottom side an adhesive (re-partable system adhesive) which serves to bond to the substrate. In the simplest form of this embodiment, the re-partable layer of adhesive itself (alone) constitutes the system. Alternatively, a system of this kind may also be of multi-layer construction, for instance with a carrier and with a further layer of adhesive on the other side of the carrier (which may likewise be a re-partable (self-) adhesive).

In this embodiment the re-partable layer of system adhesive is such that, after bonding, it cures or loses its adhesive properties in another way, with the consequence that, although the bonded joint is initially retained, the layer of adhesive is no longer tacky following redetachment from the substrate (adhesives in this sense, then, are all compositions, especially polymer compositions, which initially produce an adhesive effect but may subsequently be present in non-adhesive and/or non-tacky form). The re-partable system adhesive may be provided on the obverse of the parting system, and so the parting of the adhesive bond takes place in particular on the side of the adhesive tape body (in particular, therefore, in relation to its main carrier), but the re-partable self-adhesive may also be provided on the reverse of the parting system, so that the parting of the adhesive bond takes place on the side of the substrate. In the former case, the system remains without exposed adhesive areas on the substrate; in the latter case, on the adhesive tape (where the parting system is composed solely of the re-partable system adhesive, or where the release system has a re-partable system adhesive both at the top and at the bottom, the location of parting is dependent on whether the bond strength is stronger with respect to the main carrier or to the substrate). Following the parting process, both surfaces in the region of the parted bonding area are present in a non-tacky form.

In the case of a multi-layer system which as well as the system adhesive has a further layer—in particular, non-re-partable—of adhesive, this further layer of adhesive has the capacity to impart a permanent adhesive bond to the substrate, if the detachment of the system adhesive takes place on the adhesive tape side, or to the adhesive tape, if the detachment of the layer of system adhesive takes place on the substrate side.

For a system adhesive of this kind, suitability is possessed, for example, by curing adhesives, curing varnishes, polymers (especially curing polymers) and the like, and also, in particular, by heat-activable adhesives which are non-tacky at room temperature (application temperature) and with which the bonding operation is carried out with heating.

The re-partable adhesive of the system may be applied over the full area of the segment carrier, the main carrier (H) and/or the respective substrate; in accordance with the invention, however, it is also possible for this adhesive to be applied only over a partial area. The re-partable adhesive can be applied advantageously in printing technology, more particularly by screen printing or by gravure printing.

A further embodiment of the adhesive tape of the invention is one in which a re-partable adhesive as described above is applied in the form of the parting system to the reverse of the main carrier, in particular by one of the aforementioned technologies.

In one outstanding variant of the adhesive tape there are two layers of the same or different re-partable adhesives present, which are delaminable under the stated requirement conditions. The parting system may be designed in particular in the form of a structure that comprises only these layers of adhesive alone; parting systems with adhesive-layer laminates of this kind may alternatively comprise further layers.

In accordance with the invention it is also possible for there to be two or more parting systems distributed over the width of the adhesive tape on its reverse.

This has the advantage, first, that the bonding area of the adhesive tape is increased; second, the splitting strength of the composite is increased. The application of different stripe geometries may also be sensible here.

In the case of two or more parting systems on the adhesive tape, they may be composed of the same material and therefore have equal splitting forces, but it may also be of advantage to provide the parting systems in different materials, so that they possess different splitting forces.

The second and, where appropriate, further parting systems on the reverse of the adhesive tape may, like the first parting system, be shaped preferably in accordance with the invention, in particular, therefore, in segmented form, but may also have other geometries—in the simplest case, a straight-line stripe, of the kind known from the prior art.

For use in the paper-processing industry in particular it is of advantage if some, better still most, and ideally all of the constituents of the adhesive tape of the invention that are employed in the operation are repulpable, i.e., in particular, water-soluble or dispersible.

As adhesives, especially self-adhesives, in the sense of the layers of adhesive (M, $M_O$, $M_U$) of the adhesive tape (K) of the invention, it is possible—selectable independently of one another with respect to the individual layers—to outstanding effect to use, among others, acrylates (water-soluble and/or non-water-soluble), natural rubber compositions, synthetic rubber compositions, mixtures of the aforementioned compositions, compositions based on copolymers and/or block copolymers, especially based on acrylates and/or natural rubbers and/or synthetic rubbers and/or styrene. With particular advantage it is possible to use dispersions, hot-melting (including hot-melt-processable) adhesives and/or solvent-borne adhesives. The adhesives are selected with a view to the particular field of use of the adhesive tape of the invention (in particular, flying splice, static splice, roll-end bonding, etc.).

In particular, not only the adhesive ($M_O$) to the segment carrier (T) but also the adhesive ($M_U$) which is subsequently brought onto the substrate to be spliced may be self-adhesives, but may also be curing adhesives.

Curing adhesives for the carrier have the advantage that they can be applied at lower layer thicknesses and hence reduce the thickness of the system as a whole. Curing adhesives in the sense of adhesive ($M_U$) on the side which is brought to the substrate to be spliced afford the advantage that particularly difficult bonding substrates are reliably bonded. Adhesives of this kind are activated, for example, by water or other solvents, or by heat. Although using these adhesives requires more time—the adhesive must in general be activated, the adhesive tape applied, and thereafter the adhesive cured—it can nevertheless be realized usually effectively in the modern production cycles, since central splice preparation is a frequent operation. In such an operation the rolls to be spliced are generally prepared 6 to 8 hours in advance.

It is particularly advantageous to use (self-)adhesives of particularly high shear strength, and the other variables that determine the adhesive properties, such as tack (initial tack), cohesion, viscosity, degree of crosslinking, ought in accordance with the invention to be optimized to the particular end use, something which can be done in accordance with the methods that are familiar to the skilled person. It is noted that in principle it is possible to use all basic types of pressure-sensitive adhesives which meet the inventive criteria.

In a further advantageous embodiment of the adhesive tape of the invention the adhesive tape is additionally provided with a detectable layer and/or at least one of the layers already described is provided with a detectable feature. This allows the adhesive tape to be detected by means of suitable detecting apparatus during the (splicing) operation. In particular by this means it is possible to achieve automated control of the operation. Given a suitable choice of the detectable feature, it is also possible by this means to transmit additional information (beyond a yes/no information item).

Detection of the layer is accomplished preferably by optical and/or electromagnetic means. For example, one of the layers may be provided with an optically detectable pattern which can be ascertained using suitable sensors in the course of travel through the machine. In a similar way, one of the layers may contain an electromagnetically detectable feature, a metallization for example, which can be ascertained using an electromagnetic sensor. On the basis of the detectability of at least one of the layers, in the course for example of the acceleration of a paper roll provided with such an adhesive tape, the adhesive tape is detected and hence the splicing or joining operation to the end of the web of the old roll is initiated at the correct point in time. Furthermore, when the paper web is processed further in what is known as a reject diverter, the adhesive tape can be detected, in order to separate out this section with the spliced connection. Hence the adhesive tape takes on the function of hitherto additionally applied labels or markings which, in the prior art, were applied manually to a roll of a web material, which led frequently to malfunctions, since the label was applied at the wrong place. Thus it is ensured that, on the basis of the ability for the adhesive tape to be detected, the precise position of the bond can be determined automatically and this join can be cut off or separated out always automatically at the correct location. With this detectable adhesive tape it is also possible to obtain information concerning the operational sequence on the basis of the rotational speed of the roll, since, for example, the movement of the adhesive tape allows information to be derived directly concerning the transport speed of the web. In a simple way the detectable layer is a metal foil, especially aluminum. The detectable layer, an aluminum foil for example, has a thickness for example of 6 to 12 µm. It is also possible for the detectable layer to be a paper sheet provided with metallisation or with metallic portions. If one of the layers is a metal foil, the other layer preferably takes the form of an acrylate dispersion, polymethyl methacrylate (PMMA), latex, polyvinyl acrylate (PVA), polyvinyl chloride (PVC) or a copolymer of these substances. With these substance combinations it is possible for the above-stated tear propagation resistances to be set in a defined and desired manner. In this context, even on prolonged storage of the adhesive tape, there are no changes in these strength values, since the forces of adhesion between these materials remain unchanged. It will be understood that both the metal foil and the further layer are each provided with a self-adhesive on their outer sides. This self-adhesive is preferably a water-soluble or water-insoluble acrylate self-adhesive. In the same way it is possible to use for example natural rubber and synthetic rubber compositions and also dispersions of the compounds described above.

It may further be advantageous for the detectable layer to be applied in turn to a carrier. In that case the detectable layer is disposed on one side of the carrier and the associated self-adhesive on the other side of the carrier. The carrier may consist of paper or of a foil/film. The carrier may be, among others, a smooth, white, bleached kraft paper.

Nature and Dimensions of the Adhesive Tape

All of the (dimension) figures below apply independently of the actual line form of the line F, even when, for illustration of the values, reference is made to one of the figures and the embodiment shown therein. The values specified then apply in a particularly advantageous way for the embodiment shown, but are not intended to be restricted thereto.

With great advantage the width of the parting system on the reverse of the adhesive tape (i.e. the extent in the y direction), measured from the leading edge regions, projecting furthest to the right, of the right-hand parting system boundary edge ($r_K$) to the left-hand parting system boundary edge ($l_K$), or, if this edge does not extend in a straight line, up to the leading edge regions, furthest to the left, of the left-hand parting system boundary edge ($l_K$), is less than the width of the adhesive tape (K), i.e. its extent in the y direction. In one preferred procedure the adhesive tape is at least twice as wide as the parting system on its reverse, based on the width terms above.

The width of the adhesive tape (the distance in the y direction between the right ($r_K$) and left ($l_K$) adhesive tape boundary edges) is advantageously between 30 and 120 mm, more preferably between 40 and 80 mm, very preferably 50 mm.

The extent of the segments in the y direction is situated preferably within a range from 5 to 30 mm, more preferably from 10 to 20 mm, and very preferably is 15 mm.

The distance in the direction perpendicular to the base line (X) between the right-hand boundary straight line $r_{TS}$ of the parting system and the left-hand boundary straight line $l_{TS}$ of the parting system, in other words the width of the parting system, is preferably up to 40 mm, in particular between 20 and 30 mm, very preferably between 15 and 25 mm. In the case of a parting system in which only identical segments lie on a base line, the preferred extent in the y-direction is 15 mm, corresponding to the y-extent of the individual segments.

In an advantageous way the ratio of the extent of the rising line sections (reference symbol "$F_s$" in the figures) in the x direction to the extent of the falling line sections (reference symbol "$F_f$" in the figures) in the x direction is within the limits of 10:1 to (1.25):1, preferably in the limits of 7:1 to (1.5):1, and very preferably in the limits of 5:1 to 2:1.

It is very advantageous if the extent of the rising line sections (reference symbol "$F_s$" in the figures) in the x direction is 10 to 40 mm, preferably 15 to 30 mm, very preferably 20 to 25 mm.

With further preference the extent of the falling line sections (reference symbol "$F_f$" in the figures) in the x direction is 5 to 30 mm, preferably 8 to 20 mm, very preferably 10 to 12.5 mm.

Figure 5:
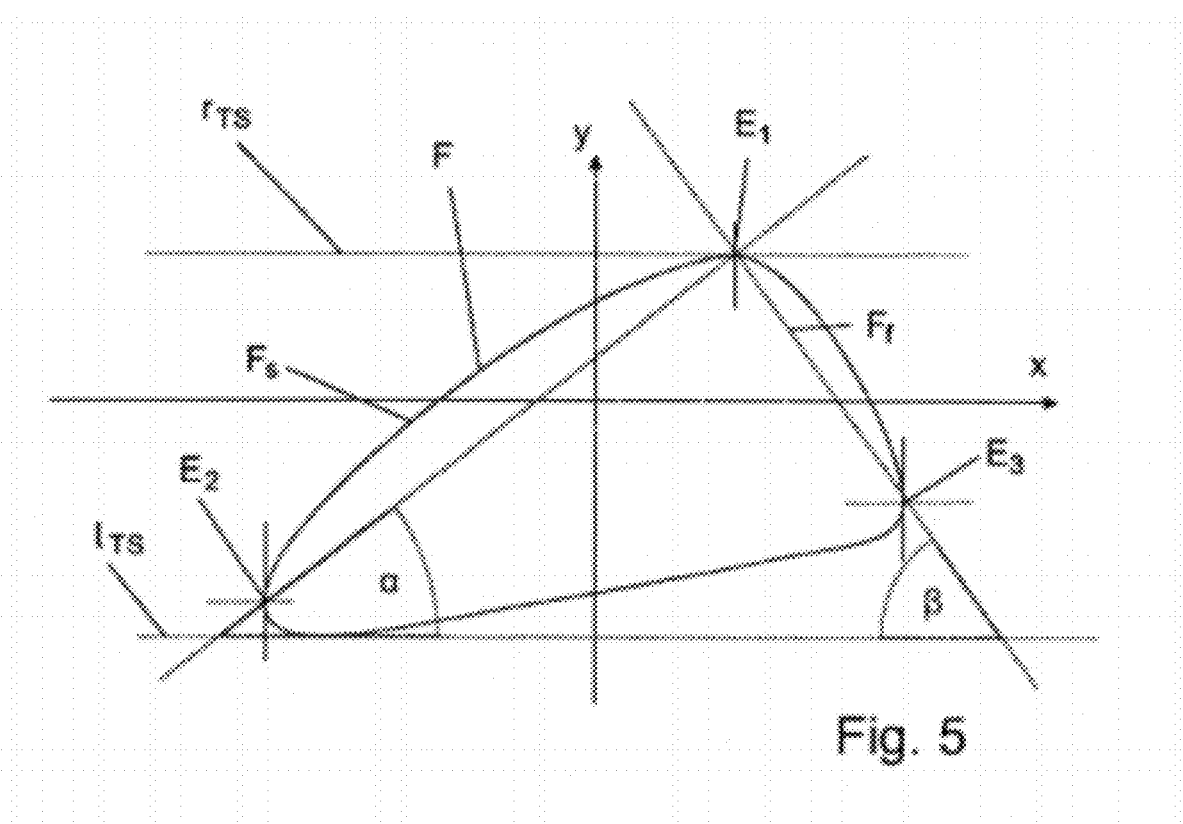
FIG. 5 diagram of a segment of the parting system for demonstrating various dimensions of the steepness of the rising line $F_s$ section and the falling line section $F_f$, having acute angles $\alpha$ and $\beta$ between compensating straight lines $G_s$ and anf $G_f$ and the x-axis.

The steepnesses of the rising line section and of the falling line section, independently of one another, are preferably dimensioned as follows (cf. for illustration FIG. 5, without any intention of restriction by the line form depicted there with regard to the general nature of the following indications):

The acute angle ($\alpha$) included between the compensating straight line ($G_s$) in the rising line section ($F_s$) of the line (F) [the straight line whose slope corresponds to the amount of the arithmetic mean over the values of the first derivative of the line (F) at each point in the rising line section ($F_s$)] and the x-axis is preferably up to 45°, more particularly between 18° and 40°, very particularly between 30° and 35°, ideally 33°.

The acute angle (β) included between the compensating straight line ($G_f$) in the falling line section ($F_f$) of the line (F) [the straight line whose slope corresponds to the amount of the arithmetic mean over the values of the first derivative of the line (F) at each point in the rising line section ($F_f$)] and the x-axis is greater than the acute angle (α) included between the straight line ($G_s$) in the rising line section ($F_s$) of the line (F) and the x-axis (based on the respective amounts of the angles without taking into account the direction of rotation). The acute angle (β) included between the straight line ($G_f$) in the falling line section ($F_f$) of the line (F) and the x-axis is preferably between 30 and 90°, in particular between 50° and 85°, very particularly between 60° and 80°, ideally 76°.

The direction of rotation from the base line to the straight line ($G_f$) in the falling line section ($F_f$) is generally opposite to the direction of rotation from the base line to the straight line ($G_s$) in the rising line section ($F_s$); the acute angle (α) enclosed between the straight line ($G_s$) in the rising line section ($F_s$) of the line (F) and the base line (X) is open in particular towards the preferential direction (v), and thus the vertex point lies in the direction opposite to the preferential direction.

The subject matter of the invention, however, also embraces those embodiments in which the two directions of rotation are the same (especially those in which both angles (α, β) have the vertex point in the direction opposite the preferential direction. In that case the line shape (F) corresponds to such a segment form with vertex points (extremes) "jumping over" in the x direction).

As already described earlier on above, the parting system (TS) bonded underneath may be arranged flush to the right longitudinal edge ($r_K$) of the adhesive tape (K) or recessed from it at a distance (V) (distance V=0). For the use of the invention in flying splice, it has proven to be very advantageous if the parting system (TS) is recessed at a distance (V) of up to 15 mm, particularly 0.5 to 7 mm, better still at a distance of 1.5 to 4 mm, very preferably from 2 to 3.5 mm. The flushness and the aforementioned distance values refer in particular to the distance between the right boundary edge ($r_K$) of the adhesive tape (K) and the parting system boundary straight line ($r_{TS}$) that is defined by the extremes of the segments that lie furthest to the right (cf. FIGS. 1b and 1d and also 4a and 4b).

As experiments have shown, it is advantageous, for a successful operating regime at high speeds, to initiate the force for the splitting operation into the splittable carrier of the splitting stripe, since otherwise there are local instances of uncontrolled tearing (referred to above as "tears"). This purpose is served by the protruding section of the adhesive tape, defined by the distance of the splitting stripe from the longitudinal edge, as an aid to force introduction. Tears have been avoided with particular success when this distance attains a certain magnitude.

If, however, the recession is too great (in particular greater than 3.5 mm), then there are increased instances of turnover of the projecting, leading section of the adhesive splicing tape, and there is also uncontrolled behaviour during the splicing operation, as is also found in experiments.

The cut or the predetermined break point (P) in the liner material (A), where present, may be provided preferably at a distance of 20 to 40 mm from the left boundary edge ($l_K$) of the adhesive tape.

An adhesive tape that has been found to be outstandingly suitable is one having the following dimensions: The following indications are understood to carry a (production-related) accuracy tolerance; this may be assumed to be about 5%. The adhesive tape has a width (extent in the y direction) of 50 mm and possesses a parting system having a sequence of mutually identical segments, as shown in FIG. 1b, whose base line (X) corresponds to the x-axis of the adhesive tape. The recession of the understuck parting system (TS) from the right longitudinal edge ($r_K$) of the adhesive tape (K) is 2 mm. The extent of the segments in the y direction is 15 mm. The extent of each rising line section ($F_s$) in the x direction is 25 mm, that of each falling line section ($F_f$) in the x direction 5 mm. The acute angle (α) included between the straight line ($G_s$) in the rising line section ($F_s$) of the line (F) and the base line (X) is 33°. The acute angle (β) included between the straight line ($G_f$) in the falling line section (f) of the line (F) and the base line (X) is 76° and has a direction of rotation which is opposite to that of the angle (α) (corresponding to the depiction in FIG. 5).

The adhesive tapes of the invention are outstandingly suitable for preventing or at least very considerably lessening the problems associated with the unwinding of an adhesive tape roll. The invention accordingly provides an adhesive tape of the invention which has been wound to form a roll, referred to as a wound roll. For rolls of this kind it is usual to use the term "roll" or "adhesive tape roll", although the rolls, viewed strictly, represent an Archimedean spiral. When reference is made in the context of this specification, to roll, adhesive tape roll or wound roll, the reference is to the winding of the adhesive tape in such a way that, in lateral section, the winding possesses the form of an Archimedean spiral (in this regard cf. FIG. 1c).

A particularly advantageous roll winding is one in which the wound adhesive tape is lined with a lining material, as already described above for the adhesive tape per se.

The invention further provides a method of flying splice using an adhesive tape of the invention.

Figure 6A:
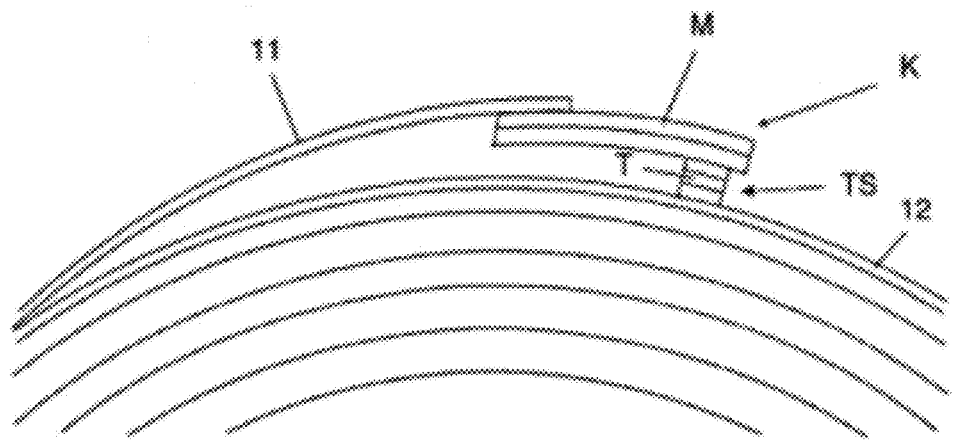
FIG. 6a-b diagrams of parting system ($T_S$) with a splitting carrier (T) which has a bottom ($M_U$) and a top ($M_O$) adhesive. The parting process is brought about by splitting of the segment carrier (T), the adhesives ($M_O$, $M_U$) being non-adhesively covered by the splitting products ($T_1$, $T_2$) of the splitting carrier (T).
Figure 6B:
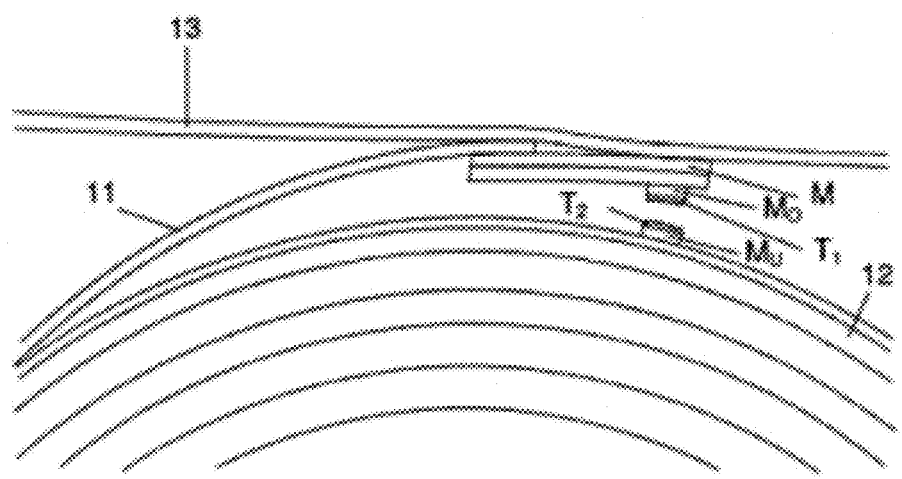

The method of the invention for joining two flat webs during the flying splice of flat-web material wound up to form rolls is shown diagrammatically in FIGS. 6a and 6b, without wishing any restriction to be imposed unnecessarily on the subject matter of the invention as a result of the diagram.

In the method of the invention, the uppermost flat-web turn (11) (in particular its end or its end region) of a new roll is fixed to the underlying flat-web turn (12) by an adhesive tape (K) comprising at least one parting system (TS) suitable for obtaining an adhesive bond which can be parted again in such a way as to be free of sticky areas, so that a portion of a self-adhesive (M) that is needed for joining to the expiring flat web (13) is exposed (cf. FIG. 6a). At this point the new roll thus equipped is positioned along an old roll that is almost completely unwound and requires replacement, and is accelerated to substantially the same rotational speed as that roll, and then pressed against the old flat web (13), the exposed self-adhesive (M) of the adhesive tape (K) bonding to the old flat web (13) with the webs at substantially equal speeds, while at the same time the bond of the uppermost flat-web ply (end ply of the turn) (11) on the underlying flat-web ply (12), said bond having been brought about by means of the parting system (TS), undergoes two-dimensional separation such that, after the parting process, there are no adhesive regions exposed; an adhesive tape of the invention is used here. The parting of the bond of the uppermost flat-web ply (11) to the underlying flat-web ply (12) is made in particular in accordance with one of the parting mechanisms already described for the adhesive tape (K) of the invention (cf. FIG. 6b).

FIGS. 6a and 6b show by way of example—without thereby wishing to subject the concept of the invention to any unnecessary restriction—a parting system (TS) with a splitting carrier (T) which has a bottom ($M_U$) and a top ($M_O$) adhesive (in this regard, see also the remarks above relating to such parting systems). The parting process is brought about by splitting of the segment carrier (T), the adhesives ($M_O$, $M_U$) being non-adhesively covered by the splitting products ($T_1$, $T_2$) of the splitting carrier (T).

In a development of the inventive method, the adhesive tape is bonded at right angles to the running flat web. In other advantageous variants of the method of the invention, the adhesive tape may also be bonded at an acute angle of up to 30° to the running flat web, in particular of up to 10°.

The parting operation [parting of the bond of the uppermost flat-web ply (11) to the underlying flat-web ply (12)] then takes place—particularly where the adhesive tape is bonded at right angles to the running flat web—transversely to the base line; in other words, the splitting or parting process begins in the maxima or maximum regions of the right boundary edge ($r_{TS}$) of the parting system (TS) and proceeds in the direction of the minima or minimum regions thereof, i.e., in the direction of the negative y-axis.

In the splicing method, the adhesive tape (K) of the invention is bonded in a straight line beneath the end of the uppermost flat-web ply (11) of a new flat web roll (or at a small distance from the end of the uppermost flat-web turn) to the new flat web roll, leaving part of the adhesive tape (K) free, while the reverse ($U_K$) of the adhesive tape bonds by means of the parting system (TS) [specifically for the corresponding adhesive tape embodiments with the adhesive ($M_U$) of the parting system (TS); not shown individually here] to the underlying flat-web ply (12) and thus secures the uppermost web ply (in particular the end of the uppermost web ply); if desired, initially only part ($A_2$) of the liner (A) that is present if desired on the self-adhesive (M) has been removed, and so the part of the self-adhesive that is required for the splicing method is still lined with the liner ($A_1$), and the roll in this state does not have a free adhesive area; thereafter, for final preparation for the splicing method, any remaining liner ($A_1$) still present is removed, after which the new roll thus equipped is placed adjacent to an almost entirely unwound, old roll that is to be replaced, and is accelerated to the same rotary speed as that roll, and then is pressed against the old web (13); the exposed self-adhesive (M) of the adhesive tape (K) bonds to the old web (13) when the webs are at substantially the same speeds, while at the same time the parting system (TS) parts the bond between the uppermost flat-web ply (11) and the underlying flat-web ply (12), with both areas in the region of what had hitherto been the bond of the uppermost flat-web ply (11) to the underlying flat-web turn (12) remaining non-adhesive.

After contact of the adhesive tape (K) with the outgoing web (13), therefore, the parting operation takes place by means of the parting system (TS) of the adhesive tape (K), and so the uppermost flat-web turn (11) of the new roll is released and there are no longer any tacky residues openly present.

The flat webs are, in particular, paper webs and/or film webs and/or webs of textile material (woven fabrics, knitted fabrics, nonwoven fabrics or the like).

Through the shape of the segments it is therefore possible to carry out outstanding adjustment of the corresponding splitting force—independently of the material—and hence to adapt it to the profile of requirements. The shape and/or geometry of the segment in question ought advantageously to require an extremely small force for initial splitting in the transverse direction of the adhesive tape (y direction). However, this force also ought not to be too low, so that in the acceleration phase the roll does not open prematurely and so lead to tearing. This applies in particular to belt-driven units, where particular strength is necessary in the region of the belt.

The stated segments are provided, transverse to the unwind direction of the adhesive tape, with an extremely low slope, thereby minimizing the tendency towards incipient splitting. As a result of the asymmetry of the segments it is nevertheless possible to ensure a sufficient adhesive area, and the splitting process opposite to the y direction can proceed optimally.

As a result of the segmentation, however, it is at the same time ensured that—should there nevertheless be any premature incipient splitting in a segment—the incipient splitting remains limited to the segment in question and is specifically unable to propagate, on account of the segmentation. With a corresponding number of segments, it can be assumed that the mere initial damaging of an individual segment can be disregarded via the total amount of segments on the adhesive tape section to be used.

The adhesive tape of the invention has shown itself to be outstandingly suitable for the intended use.

The invention claimed is:

1. Adhesive tape for flying splice, having a left and right boundary edge, comprising at least one main carrier and a first layer of self-adhesive on the obverse of the main carrier, the reverse of the main carrier bearing a parting system which is suitable for effecting an adhesive bond to a substrate that can be parted again in such a way that sticky residues are left neither on the reverse of the main carrier nor on the substrate in the region of the parted bond, the parting system being constructed in the form of a multiply interrupted stripe comprising a plurality of segments that extends in the longitudinal direction of the adhesive tape (x direction), shaped such that the boundary edge of each of the segments can be represented by a line F which, in relation to a right-handed Cartesian (orthogonal) coordinate system, with an x-axis lying in the longitudinal direction of the adhesive tape and a y-axis standing perpendicularly to said x-axis and pointing from left to right, meets the following conditions:

a point lying furthest right $E_1(x_1/y_{max})$ ("extreme") or a region $B_1$ ("extreme region") which encompasses a plurality of points lying furthest right and which is bounded by the points $E_{1a}(x_{1a}/y_{max})$ and $E_{1b}(x_{1b}/y_{max})$, with $x_{1a} < x_{1b}$, a point $E_2(x_{min}/y_2)$ lying least far in the x direction or a region $B_2$ which encompasses a plurality of points lying least far in the x direction and which is bounded by the points $E_{2a}(x_{min}/y_{2a})$ and $E_{2b}(x_{min}/y_{2b})$, with $y_{2a} < y_{2b}$, a point $E_3(x_{max}/y_3)$ lying furthest in the x direction or a region $B_3$ which encompasses a plurality of points lying furthest in the x direction and which is bounded by the points $E_{3a}(x_{max}/y_{3a})$ and $E_{3b}(x_{max}/y_{3b})$, with $y_{3a} < y_{3b}$, a rising line section ($F_s$) which is bounded by the points $E_2$ or $E_{2b}$ and $E_1$ or $E_{1a}$, a falling line section ($F_s$) which is bounded by the points $E_1$ or $E_{1b}$ and $E_3$ or $E_{3b}$, and for the plurality of the segments the steepness in the rising line section ($F_s$) being lower than the steepness in the falling line section ($F_f$), the steepness of a line section denoting the amount of the slope of a straight line ("straight steepness line") through the two line points bounding the line section.

2. Adhesive tape according to claim 1, wherein the extent of the individual segments in the x direction is lower by a multiple than the extent of the adhesive tape in the x direction.

3. Adhesive tape according to claim 1, wherein the extent of the stripe formed by the segments in the transverse direction of the adhesive tape, in other words the y direction, is lower than the extent of the adhesive tape in that direction, in other words lower than the width of the adhesive tape.

4. Adhesive tape according to claim 1, wherein the stripe constitutes a sequence of identical segments and identical distances between the segments, the segments being arranged one after another in the x direction.

5. Adhesive tape according to claim 1, wherein the segments each comprise a further carrier ("segment carrier") which is provided on each of its obverse and its reverse with a layer of adhesive, the segment carrier being two-dimensionally splittable or delaminable.

6. Adhesive tape according to claim 5, wherein the segment carrier is a single-ply paper.

7. Adhesive tape according to claim 6, wherein the segment carrier is an assembly of two or more layers, an assembly of at least two film layers or an assembly of at least one paper layer and at least one film layer.

8. Adhesive tape according to claim 1, wherein the segments comprise a polymer compound which effects the adhesive bond.

9. Adhesive tape according to claim 8, wherein the polymer is applied to the reverse of the adhesive tape by printing or gravure printing.

10. Adhesive tape according to claim 1, wherein the adhesive forming the first layer of adhesive is an adhesive based on acrylate, on natural rubber or on synthetic rubber.

11. Adhesive tape according to claim 1, wherein the reverse of the main carrier, outside the multiply interrupted stripe, carries one or more further parting systems which are suitable for effecting an adhesive bond to a substrate that can be parted again in such a way that sticky residues are left neither on the reverse of the main carrier nor on the substrate in the region of the parted bond.

12. Adhesive tape according to claim 1, wherein the adhesive forming the layer of adhesive on the obverse of the adhesive tape is an adhesive based on acrylate, on natural rubber or on synthetic rubber.

13. Adhesive tape according to claim 1, wherein the reverse of the adhesive tape bears one or more further parting systems.

14. Adhesive tape according to claim 13, wherein not all of the parting systems on the adhesive tape reverse have the same geometry.

15. Wound roll of an adhesive tape according to claim 1.

16. Method of joining two flat webs during the flying splice of flat-web material wound up to form rolls, comprising fixing an uppermost flat-web turn of a new roll to the underlying flat-web turn by an adhesive tape comprising at least one parting system suitable for obtaining an adhesive bond which can be parted again in such a way as to be free of sticky areas, so that a portion of a self-adhesive that is needed for joining to the expiring flat web is exposed on the obverse of the adhesive tape, positioning the new roll thus equipped alongside an old roll that is almost completely unwound and requires replacement, and accelerating the new roll to substantially the same rotational speed as that the old roll, and then pressing the new roll against the old flat web, the exposed self-adhesive of the adhesive tape bonding to the old flat web with the webs at substantially equal speeds, while at the same time the bond of the uppermost flat-web ply on the underlying flat-web ply, said bond having been brought about by means of the parting system, undergoing two-dimensional separation such that, after the parting process, there are no adhesive regions exposed, wherein the adhesive tape is an adhesive tape having a segmented parting system according to claim 1.

17. Method according to claim 16, wherein the parting process of the parting system begins in the extremes or extreme regions of the segments, the parting process proceeding transversely to the base line, in other words, in the direction of the negative y-axis.

* * * * *